Feb. 14, 1961 J. T. WATTERS 2,971,797
RELEASABLE SPREADER FOR VEHICLE BODIES
Filed June 9, 1959
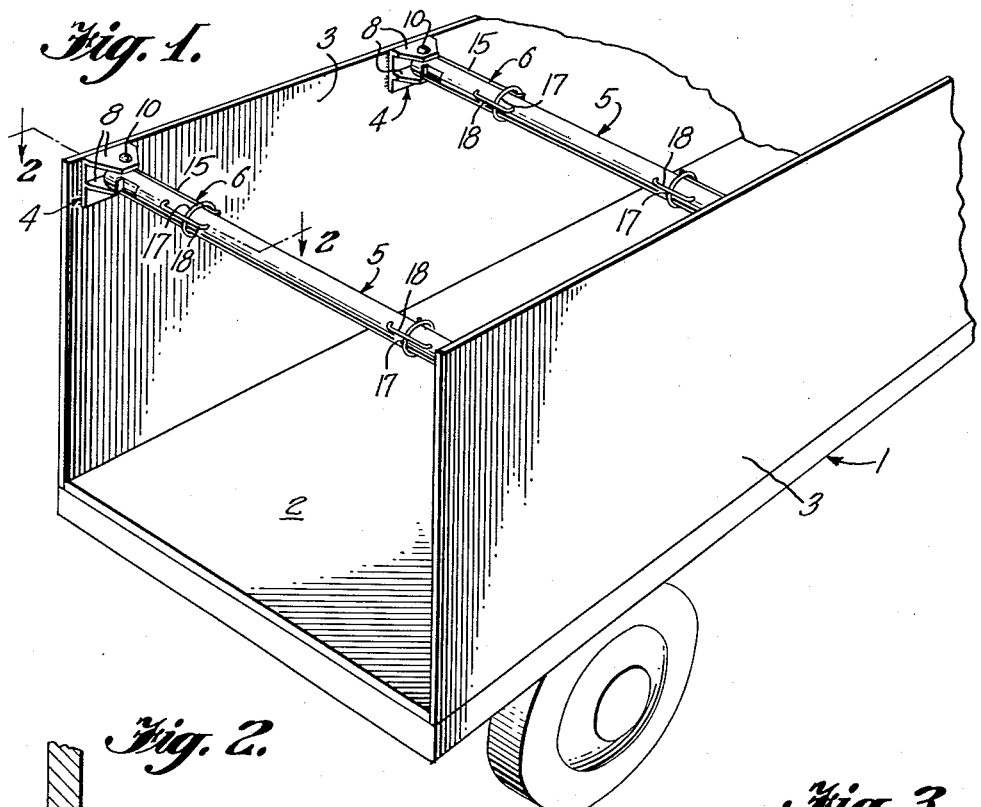
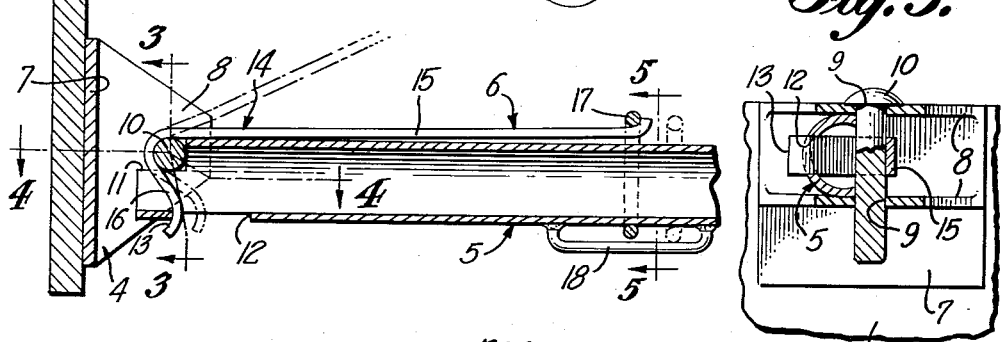
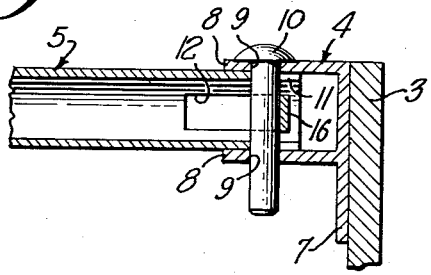
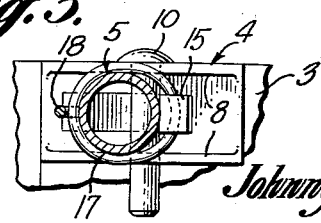
INVENTOR
Johnny T. Watters
BY Mason, Fenwick & Lawrence
ATTORNEYS

# United States Patent Office 2,971,797
Patented Feb. 14, 1961

2,971,797
RELEASABLE SPREADER FOR VEHICLE BODIES

Johnny T. Watters, Savannah, Ga., assignor to Great Dane Trailers Inc., Savannah, Ga., a corporation of Georgia Filed June 9, 1959, Ser. No. 819,123

9 Claims. (Cl. 296—40)

This invention relates to spreaders for open topped vehicle body walls and particularly to such devices having improved latching and releasing means.

Trucks and trailers for hauling bulk materials, such as fruit or grain, usually are open topped and have to have some means to hold the vehicle sides against inward collapse when the vehicle is unloaded, and against outward bursting pressure when loaded. This has been accomplished by using a combination of binder chains and spreader bars, the spreader bars serving to hold the sides in fixed position and against inward collapse when the vehicle is unloaded, and the chains serving to hold the sides against spreading under pressure of the load and also binding the sides against the ends of the spreader bars. This arrangement has been satisfactory insofar as holding the sides is concerned, but it is extremely difficult to release the spreaders when the vehicle is loaded and they are not functioning to hold the walls apart.

The object of the present invention is to provide spreaders which will serve the purpose of both spreader and binder chain, in that they will hold the walls against inward and outward movement.

Another object is to provide such a device which has latch means at its ends that will be very easy to fasten and, when fastened, will have quite positive holding capabilities.

A further object is the provision of a spreader having a latch that will be extremely easy to release whether the wall to which the spreader is fastened is exerting an inward collapsing pressure against the end of the spreader, or the wall is tending to move outwardly under pressure of the load in the vehicle.

Other objects of the invention will become apparent from the following description of one practical embodiment thereof, when taken in conjunction with the drawings which accompany, and form part, of this specification.

In the drawings:

Figure 1 is a perspective view of one end of an open, or bulk material, trailer, showing two spreaders in position between the side walls;

Figure 2 is a partial horizontal section through one wall of the vehicle and the adjacent end of a spreader and its latch mechanism, taken substantially on the line 2—2 of Figure 1;

Figure 3 is a vertical transverse section taken on the line 3—3 of Figure 2 illustrating the manner in which the spreader latch cooperates with a bracket on the vehicle wall;

Figure 4 is a vertical section taken on the line 4—4 of Figure 2; and

Figure 5 is a vertical transverse section through the spreader, illustrating the latch bar holding ring, and is taken on the line 5—5 of Figure 2.

In general, the invention contemplates the use of a latch bar to hook into the end of a spreader and, after encircling engagement of a bracket pin affixed to the vehicle side, be held in position horizontally along the spreader. Upon release of the holding means, the latch bar may be quickly and freely released from the bracket pin and the spreader end.

Referring to the drawings in detail, there is shown in Figure 1 a truck or trailer 1 having a bed 2 and vertical side walls 3. The walls are provided with securing brackets 4, and spreaders 5 having latch means 6 at their ends are shown in position between the fastening brackets.

The brackets 4 which are mounted on the vehicle sides consist of mounting plates 7 from which project pairs of spaced ears 8. The brackets are mounted on the vehicle sides by bolts, rivets or welding, with the ears projecting inwardly of the vehicle body. The bracket ears are apertured, as at 9, and pins 10 are inserted through the openings. The pins may be fixed, or removable, as desired.

The spreaders 5 are composed of lengths of tubing long enough to span the vehicle body and extend between the ears of the securing brackets 4. The diameter of the spreaders may be whatever is required for proper strength.

At each end, the spreaders are notched to provide a seat 11 for the securing bracket pins 10. The notches should be at least as deep from the spreader end longitudinally inward and diametrically from the spreader surface toward the center as the diameter of the pin, so that the pin will seat completely within the notch. The spreaders are apertured in their sides opposite the seats 11 to provide slots 12 to receive the hooked ends 13 of latch bars 14, which form the principal elements of the latch means 6. Latch bars 14 are formed of flat bar stock, and include a relatively long operating arm 15 and a short latch arm 16 that terminates in the hook 13. The latch and operating arms lie at an angle to one another, and the bend at the juncture of the two forms a curve to seat upon the pin 10 of the securing bracket.

The latch bar is held in latching position by a lock ring 17 which is slidable on the spreader and over the end of the operating arm of the latch bar. The lock ring is held against excessive movement along the spreader by means of a confining loop 18 which has its ends welded to the side of the spreader.

In using the spreader, it is positioned across the vehicle body with its ends between the ears of opposed securing bracket ears 8, and the pins 10 seated in the notched ends of the spreader. The hook end of a latch bar is then inserted between the mounting plate of the securing bracket and the pin 10 and hooked into the slot 12. As the operating arm of the latch bar is pulled down toward the spreader bar the bend at the juncture of the operating and latch arms of the latch bar will embrace the pin 10, seating it firmly in the notched end of the spreader and locking the spreader to the securing bracket. Ring 17 is slipped over the end of the latch bar to hold it against outward movement. When it is desired to release the spreader, it is necessary only to slide the ring 17 over the end of the latch bar so that the bar is free to swing outwardly away from the spreader. The latch bar can then be unhooked from the slot 12 and entirely removed, leaving the spreader free for removal from the securing bracket.

It will be obvious that the present spreader and its latch are freely releasable whenever desired. If the pressure against the sides is outwardly, it assists in moving the latch bar to unhooking position. If the wall pressure is inwardly, it is taken by the shoulder of the spreader end notch so that the latch bar is readily removable.

While in the above one practical embodiment of the invention has been disclosed, it will be understood that the details of construction described and shown are merely by way of illustration and the invention may take other forms within the scope of the appended claims.

What is claimed is:

1. A spreader to span the body and interconnect the side walls of an open topped load carrying vehicle in which the side walls have opposed securing pins to which the spreader may be attached comprising, a length of tubing having notched seats at its ends opening to the sides of the tubing to receive and seat the securing pins of the vehicle walls, said tubing having slots in its side walls adjacent the ends and opposed to the notches, latch bars having latching and operating arms angularly arranged with respect to one another so that the latching arm may traverse the length of tubing and engage the slot while the operating arm lies along the tubing length with the latch bars at the angular intersections of the operating and latching arms encompassing the pins to hold them in the notched seats of the tubing, and means to engage the free end of the operating arms of the latch bars and hold them to the length of tubing.

2. A spreader as claimed in claim 1 wherein the means to engage the free end of the latch bar comprises a ring slidable along the length of tubing and over the latch bar.

3. A spreader as claimed in claim 1 wherein the end of the latching arms of the latch bars are hooked for latching engagement with the edges of the slots in the length of tubing.

4. In a spreader to span the body and interconnect the side walls of an open topped load carrying vehicle, means to couple the spreader to the vehicle walls comprising, a pin carried by the wall spaced from the wall, the spreader having adjacent one end a notch opening to one side of the spreader to form a seat for the pin, the notch being elongated in the direction of the spreader length, a fulcrum formed on the spreader transversely spaced from the notch, a latch bar separate from the spreader engageable with the fulcrum and the pin seated in the notch and swingable about the fulcrum to draw the pin to one end of the notch, and means to hold the latch bar in position holding the pin against said one end of the notch.

5. In a spreader to span the body and interconnect the side walls of an open topped load carrying vehicle, means to couple the spreader to the vehicle walls as claimed in claim 4 wherein the end of the spreader having the notch is hollow, and the spreader wall opposite the notch has a slot with an edge of the slot forming said fulcrum.

6. In a spreader to span the body and interconnect the side walls of an open topped load carrying vehicle, means to couple the spreader to the vehicle walls as claimed in claim 4 wherein there is a bracket secured to the wall of the vehicle and said pin is removably mounted in the bracket.

7. In a spreader to span the body and interconnect the side walls of an open topped load carrying vehicle, means to couple the spreader to the vehicle walls as claimed in claim 4 wherein the other end of the spreader has a similar notch and fulcrum, a second latch bar, and means to hold the second latch bar in latch position.

8. In a spreader to span the body and interconnect the side walls of an open topped load carrying vehicle, means to couple the spreader to the vehicle walls as claimed in claim 4 wherein the latch bar has angularly related actuating and operating arms, the actuating arm adapted to lie transversely of the spreader and engage the fulcrum and pin and the operating arm adapted to lie substantially parallel to the spreader when the bar is in latched position.

9. In a spreader to span the body and interconnect the side walls of an open topped load carrying vehicle, means to couple the spreader to the vehicle walls as claimed in claim 8 wherein the means to hold the latch bar is a ring slidable on the spreader and engageable over the end of the operating arm of the latch bar.

References Cited in the file of this patent

UNITED STATES PATENTS

| | | |
|---|---|---|
| 2,425,875 | Hermann | Aug. 19, 1947 |
| 2,546,929 | Nampa | Mar. 27, 1951 |
| 2,576,397 | Grilley | Nov. 27, 1951 |

FOREIGN PATENTS

| | | |
|---|---|---|
| 983.075 | France | Feb. 7, 1951 |
| 835,995 | Germany | Apr. 7, 1952 |